Sept. 14, 1965 R. L. WILEY 3,205,925
BRAKE MECHANISM FOR POWER SCREWDRIVER
Filed Dec. 20, 1962 2 Sheets-Sheet 1

INVENTOR.
Russell L. Wiley
BY
ATTY.

Sept. 14, 1965  R. L. WILEY  3,205,925
BRAKE MECHANISM FOR POWER SCREWDRIVER
Filed Dec. 20, 1962  2 Sheets-Sheet 2
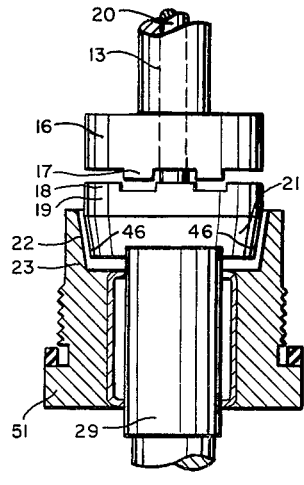
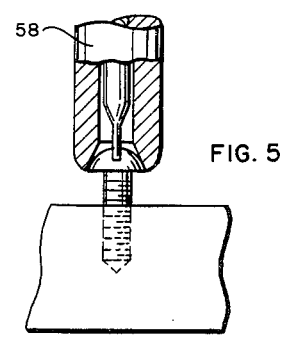
FIG. 5
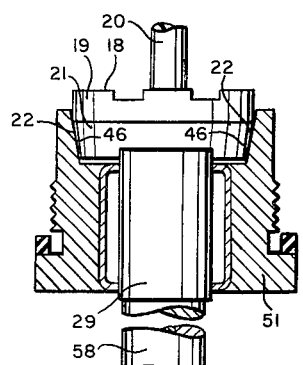
FIG. 6
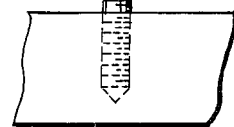
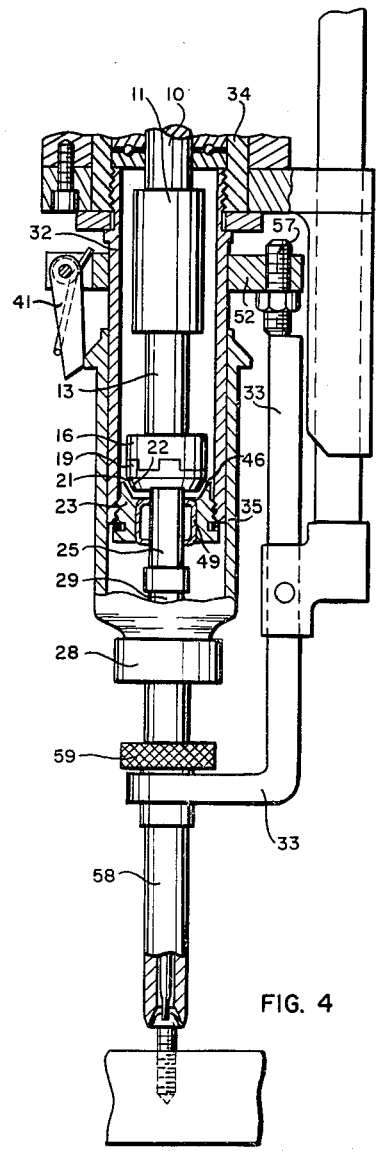
FIG. 4
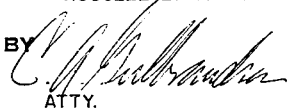
INVENTOR
RUSSELL L. WILEY
BY
ATTY.

3,205,925
BRAKE MECHANISM FOR POWER SCREWDRIVER
Russell L. Wiley, Sycamore, Ill., assignor, by mesne assignments, to Automatic Electric Laboratories, Inc., Northlake, Ill., a corporation of Delaware
Filed Dec. 20, 1962, Ser. No. 246,112
1 Claim. (Cl. 144—32)

My invention relates generally to the art of power screwdrivers and more particularly to a brake mechanism for such a machine.

Certain power screwdrivers constructed heretofore were designed to drive a screw or a fastener part way into a workpiece, thus facilitating the insertion of a wire terminal or other component under the screw head during assembly. The object in mind was to eliminate the need for manually backing off a screw, that had been driven into the workpiece by some automated means, before inserting a wire terminal thereunder. Although providing this feature indeed represented a contribution to the art of power screwdrivers it was not entirely satisfactory. This was because the clutch mechanism was constructed dependent upon friction or rotational resistance created by the thread engagement of the screw and the threaded hole of the workpiece to stop the screw bit from rotating after a spindle advance had ceased. As a result, if there was a sloppy thread engagement or the spindle speed was too fast the screw would proceed to over travel after the clutch mechanism would stop due to the inertia force of the screw. Thus instead of the screw being turned two threads into the workpiece, for example, it would be turned three threads or something more than two. This would be enough at times to require the operator to manually back off the screw a thread or so, so he could proceed and insert the wire terminals or whatever component was inserted under the screw head.

On the other hand, if thread engagement was tight the screw would not reach its desired depth due to the use of a ratchet arranged driving clutch assembly. This assembly was made to slip and thus stop rotation of the bit when a certain amount of rotational resistance was encountered at the screw, regardless of whether the preset depth had been reached. In addition to this characteristic a spring and adjusting nut was required for setting the point of this slippage.

To resolve the problem of screw over travel it was frequently the practice to reduce the spindle speed so that the inertia forces would not be great enough to produce further rotation of the screw. Although this was a solution when the thread engagement was a loose fit it was not with a tight thread engagement. Therefore with the prior art screwdriving mechanism it was not possible to control both conditions so that a screw would be driven into a workpiece a specific depth each time. Furthermore, reducing spindle speed in itself would drop the production rate and increase the unit cost of the workpiece.

According to my invention a screw can be consistently driven into a workpiece to a predetermined depth within precision tolerances and the design of the driving clutch used therefore substantially simplified. This result is accomplished by the incorporation of a brake mechanism into a power screwdriver of otherwise conventional design. The mechanism features a driven clutch element with a peripherally shaped projection or brake portion formed at its lower end and a brake shoe element with a bevel edged recess or counter bored hole which receives the brake portion at a specific time in the operation sequence. Cooperation of the two components effects a braking action toward the rotating bit. This action is virtually instantaneous and as a result the bit is stopped at the desired depth each time.

The principal object of my inventtion is to provide a power screwdriver with a brake mechanism which is capable of driving a screw into a workpiece a predetermined depth without being influenced by the state of thread engagement.

Another object of my invention is to provide a brake mechanism for a power screwdriver which can be incorporated into an otherwise conventional power screwdriver structure.

Another object of my invention is to provide through the brake mechanism an improved and simplified power screwdriver design.

Still another object of my invention is to provide a brake mechanism which will eliminate the operation of manually backing off a screw from a workpiece in order to insert a wire terminal.

Other and further objects and advantages of the present invention will become apparent from the following description when taken in connection with the accompanying drawings wherein:

FIG. 4 is a sectional view similar to FIG. 2 and showing the clutch elements according to the invention completely engaged and the spindle at the end of its downward stroke;

FIG. 5 shows a partial cross-sectional view of some of the pertinent parts of the invention and the clutch elements at the point of disengagement;

FIG. 6 shows a partial cross-sectional view similar to FIG. 5 with the clutch elements disengaged and the brake engaged.

Figure 1:
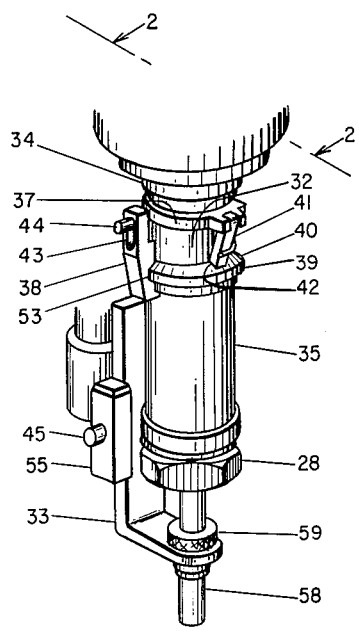
FIG. 1 is a perspective view of a power screwdriver according to my invention.

Referring now to the drawings and in particular to FIG. 1 thereof. There the enclosure or external casing for the pertinent parts of my invention are shown. In general the enclosure includes an air cylinder 34, a round shaped quill 32, a round shaped clutch assembly housing 35, and a bit sleeve 58. More specifically, quill 32 extends axially from the lower end of the air cylinder and is received by clutch assembly housing 35. The lower end of clutch assembly housing 35 receives a stop nut 28 through which extends sleeve 58. The sleeve in turn extends through a sleeve nut 59 and a leg of an L-shaped stop bracket 33. Stop plate 55 is secured to the vertical leg of the bracket by means of screw 45.

Figure 2:
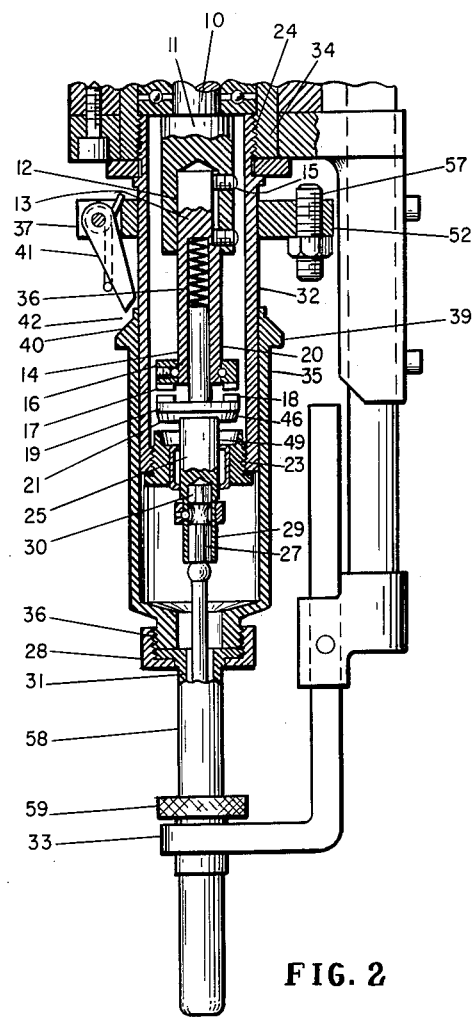
FIG. 2 is a sectional view of the power screwdriver shown in FIG. 1 and taken along the line 2—2.

Mounted to the round external surface of quill 32 is control collar 37 which is preferably rectangular in cross section and which includes by way of attachment a lifter lever 38, a control lever 41, and stop arm 52—see FIG. 2. The control collar with its attachments is the means for regulating the length of stroke and moving both the quill and the clutch assembly housing concurrently and independently at different stages of the stroke. To illustrate generally, at the first stage of the operation cycle the entire aforementioned external casing moves concurrently. At another stage only quill 32 moves while clutch assembly housing 35 and bit sleeve 58 do not. Therefore quill 32 telescopes within assembly housing 35. During the restoring stroke of the operation the lifter 38 causes clutch assembly housing 35 to move concurrently with quill 32.

The structure of lifter lever 38 includes a slot 43 through which an adjustment screw 44 extends and makes engagement with the main of collar 37. At the lower end of this lifter lever is a slot 53 whose contour duplicates the contour of the peripheral ring 39 located at the upper end of clutch assembly housing 35. In this manner lifter lever 38 is able to regulate and control the movement of assembly housing 35 relative to the movement of quill 32. The control lever 41 is used to move the quill 32 and the clutch assembly housing 35 concurrently until such time that the sleeve 58 and bit 30 engage a screw head and press it against a workpiece. To accommodate this movement control lever 41 is hinged to the collar 37 and is spring loaded so that it is normally urged toward the surface of the quill, and during the time when quill 32 and clutch assembly housing 35 move concurrently will ride against beveled surface 40. However when the workpiece is engaged as stated, the control lever rides over the beveled surface and slides along the external surface of the clutch assembly housing 35. Therefore it should be noted that during the first part of the downward stroke the quill 32 and the clutch assembly housing 35 move concurrently and during the latter part of the stroke the two components move relative with respect to each other. In this manner the power screwdriver has a chance to ready a screw of insertion of a workpiece.

FIG. 2 shows a section of FIG. 1 and the inner component parts of my invention. Therein it will be noted that the pertinent structure includes a spindle or shaft 10 which has its upper end located within the aforementioned air cylinder 34. The lower end includes an enlarged portion 11 with a bore 12. Received by this bore is the upper end of a shaft 13 that is secured by a pair of set screws 15. Formed at the lower end of this shaft is a driving clutch element 16, which includes a set of teeth-like projections 17 extending from its lower end, and a second bore 14 which receives a spring 36 and the upper end of stub shaft 20. Connected to the lower end of stub shaft 20 is a driven clutch element 19 which also includes a set of teeth-like projections 18 that extend upward and which are complementary with respect to projections 17. Extending from the lower end of driven clutch element 19 is another stub shaft 25 and a brake portion 21 having a beveled edge 46. The stub shaft extends through a bore 49 of brake shoe element 23 and includes at its lower end a reduced diameter portion 29 with a bore 27 therein. Received by this bore is the upper end of bit 30 which extends downward through aperture 31 of stop nut 28, through sleeve 58 through sleeve nut 59 and through aperture (not shown) in stop bracket 33. Sleeve 58 should be considered representative of a pair of fingers which receive a screw from a hopper mechanism for example and which would facilitate the engagement of the end of bit 30 with a screw head (FIG. 4).

Quill 32 is attached to air cylinder 34 by means of a threaded portion at 24 making engagement with a corresponding thread of the air cylinder. As aforementioned the lower end of quill 32 is received by and slidable within the clutch assembly housing 35. Furthermore, the lower end of quill 32 receives, by thread engagement, end piece or brake shoe element 23. The clutch assembly housing 35 includes a threaded portion 36 at its lower end and the peripheral ring 39 at its upper end. Making engagement with the threaded portion 36 is the stop nut 28 which secures the sleeve 58 and the aforementioned bit 30 to the end of housing 35.

Also seen in FIG. 2 is the aforementioned stop arm 52 which includes an adjustment screw 57 which is used to adjust the length of the reciprocating stroke of the spindle 10, quill 32 and driving clutch element 16, and makes contact with stop bracket 33, see FIG. 1. Therefore, the stop bracket is aligned with adjustment screw 57 so that as the quill 32 moves downward and reaches the designated distance the screw 57 contacts the end of stop bracket 33 thereby restricting the stroke that the quill and spindle make.

Figure 3:
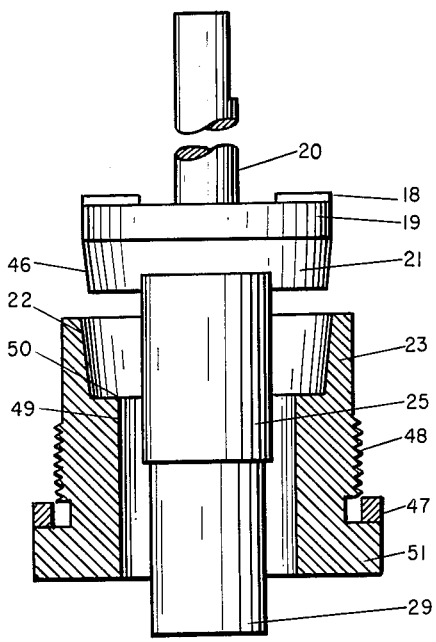
FIG. 3 is an enlarged sectional view of the brake mechanism according to a particular embodiment of the invention.

FIG. 3 shows the aforementioned brake mechanism in exploded view. The mechanism consists basically of two cooperating components, projection or brake portion 21 and brake shoe element 23. Each element is integrally associated with other important parts of the screwdriving mechanism aforementioned and is made from a different material than its mating component. By way of example the brake portion could be made of a hardened steel while the brake shoe element is made of an unhardened steel or any other different material which would be consistent with good machine design practice and result in optimum braking efficiency. A requirement for the material used is that it does not have an inherent lubricity characteristic, this would tend to decrease the instantaneous braking action of the mating surfaces and thus be undesirable for the particular application.

Brake portion 21 is mounted or integrally formed to the lower end of the aforementioned driven clutch element 19 and has a substantially flat lower surface and a beveled or cone shaped contour at its edge. In addition, the brake portion includes a stub shaft 25 which extends through bore 49 and is connected to bit 30. Therefore, in effect, bit 30 is connected to brake portion 21 and rotates and reciprocates therewith. Brake shoe element 23 represents the end plate or end piece to quill 32. Accordingly, the brake shoe element includes, in addition to the bore 49 which receives the stub shaft and the counterbore 50 which cooperates with brake portion 21, threaded portion 48 and flange 51. The threaded portion receives the corresponding threaded portion at the lower end of the quill. Furthermore, stop ring 47 is formed at the upper surface of flange 51 and serves as a stop to quill 32 after the latter has been turned on threaded portion 48.

An important feature of the brake mechanism is its simplicity of design and resultant minimum cost. This is attributed to the fact that the brake mechanism as herein envisioned can be made without the ratchet arrangement used in prior art machines. It is to be understood however that although in the preferred embodiment the brake mechanism is not shown in combination with a ratchet arrangement as used in the prior art this can be done where it is desired to use the machine in two capacities, for driving a screw part way into a workpiece and for homing a screw completely to a specific torque.

It should also be noted that the configurations of the brake portion 21 and brake shoe element 23 are complementary to an extent where the beveled sides 46 and 22 thereof make instantaneous and complete contact when the two parts are brought together during the operation cycle. This characteristic, rendered by the particular form of the mating parts, insures maximum braking action in an instant.

The elements making up the invention have been described and now the operation thereof will be illustrated. For this it must be understood that rotational movement of the spindle 10 is provided by an electrical motor (not shown) which rotates a pulley for example at the very upper end of the spindle. The spindle and the other components of the screwdriving mechanism are normally moved in a downward direction by air pressure directed into the air cylinder surrounding the spindle, and restored by a restoring spring (also not shown). The air pressure usually is on or off in response to the operator depressing a button or foot pedal.

Referring now to FIGS. 4–6, in a restored state, driving clutch element 16 is rotating and disengaged from driven clutch element 19. The latter is idle by virtue of brake surface 46 being in contact with brake surface 22. The spindle is then moved downward to cause the other elements shown in FIG. 2, except stop bracket 33, to move downward. As soon as the ends of bit 30 and sleeve 58 contact the selected screw head, the driven clutch element 19 stops moving downward. This results initially in the brake element 21 disengaging itself from the brake shoe element 23 and the driving clutch element 16 approaching driven clutch element 19. Spring 36 keeps the clutch elements from engaging until its compression strength is exceeded by the downward force of clutch element 16 and the upward force caused by engagement of sleeve 58 with the screw head. Once engagement of teeth 17 and 18 of the clutch elements takes place, positive drive is exerted on bit 30 and the screw is caused to rotate and enter the workpiece.

As the screw is turned downward, the sleeve 58 frees itself from the screw head so that the screw is free to turn. It is necessary that the screw be held initially by the sleeve until it is supported by the workpiece. The screw can be viewed as being moved into position under the lower end of sleeve 58 by a hopper and automatic feed arrangement. Simultaneously with this engagement, the lever 41 rides over the surface of ridge 40 and along the surface of housing 35.

The spindle and clutch elements 16 and 19 continue to move downward until stop screw 57 engages the top of stop bracket 33 as seen in FIG. 4. Upon reaching this stage, the driving clutch element 16 stops its downward movement while continuing its rotation until after the teeth of the clutch element are disengaged. This state is shown in FIG. 5. It should be clear therefore that the screw head is a certain distance from the top of the workpiece when stop 57 engages bracket 33, but that it continues downward due to the continued rotation of driven clutch element 19 due to its inertia.

This continued rotation of element 19 will drive the screw downward a certain distance until braking surface 46 engages surface 22 to cause a positive stop of the driven element and the screw. Actually the continued rotation of the driven element could cause the screw to be driven further down were it not for the engagement of the braking surfaces and therefore the distance of the screw head from the top of the workpiece is positively controlled. For instance if no brake were provided, a screw might turn, for example, from 2 to 5 threads downward after disengagement of the clutch. While 2 threads might be acceptable, 5 threads would be too much and would prevent a tab from being inserted under the screw head. Thus according to the invention the stop 57 is set so that the brake becomes effective after the screw moves a distance equivalent to two threads after disengagement of the clutch.

It should now also be apparent that the incorporation of the brake mechanism herein envisioned enables a manufacturer to substantially simplify a power screwdriving mechanism where the latter is to be used specifically to drive a screw part way into a workpiece. Furthermore, it should be clear that where a screwdriving machine is to be used additionally to drive a screw completely into the workpiece to a specified torque that the brake mechanism can be used in combination with a conventional type ratchet arrangement.

My invention has been described in connection with a preferred embodiment, however, this was done merely by way of example and not intended to impose a limitation to the spirit and scope of my invention as hereinafter claimed.

What is claimed is:

In a screwdriver device for driving a screw partially into a workpiece and controlling the distance that the head thereof is from the workpiece, and including a primary shaft which rotates and moves in an up and down direction, a cylinder, a quill having an internal thread portion at one end and reciprocable with respect to the cylinder, a clutch assembly including a driving element interconnected with said primary shaft and a driven element engageable with said driving element, and a screwdriving bit interconnected with said driven element, the combination comprising:

a stop assembly including an adjustable stud and a bracket normally spaced therefrom, said stud being connected to said quill and moveable therewith, said bracket being fixedly connected to said device and aligned with said stud to stop the downward movement of said quill and the corresponding downward movement of said driving element and to restrict the corresponding positive drive exerted on said driven element by rotation of said primary shaft, and a brake comprising a first brake portion integrally connected to said driven element and having a beveled side surface, and a second portion having an external thread engaged with said internal thread portion of said quill and an aperture through which said screwdriving bit extends, said second portion also having a recess constructed and arranged to receive said first portion and make contact therewith at said beveled side surface in order to stop the rotation of said driven element and said screwdriving bit with the head of the screw above said workpiece a distance predetermined by the adjustment of said adjustable stud.

References Cited by the Examiner

UNITED STATES PATENTS

| | | | |
|---|---|---|---|
| 2,394,348 | 2/46 | Wilhide | 144—32 |
| 2,790,471 | 4/57 | Grayhill | 144—32 |
| 2,820,494 | 1/58 | Haberstump | 144—32 |

WILLIAM W. DYER, Jr., *Primary Examiner.*

DONALD R. SCHRAN, J. SPENCER OVERHOLSER, *Examiners.*